No. 739,519. Patented September 22, 1903.

UNITED STATES PATENT OFFICE.

CHARLES C. THERKILDSEN, OF CHICAGO, ILLINOIS.

PRESERVING COMPOUND FOR PACKING EGGS.

SPECIFICATION forming part of Letters Patent No. 739,519, dated September 22, 1903.

Application filed May 23, 1903. Serial No. 158,424. (No specimens.)

*To all whom it may concern:*

Be it known that I, CHARLES C. THERKILDSEN, a subject of the King of Denmark, residing in the city of Chicago, county of Cook, and State of Illinois, have invented a new and useful Improvement in Preserving Compounds for Packing Eggs, of which the following is a specification.

My invention relates to preserving compounds for packing eggs, such as hens' eggs; and the object of my invention is to provide inexpensive means whereby the eggs may be kept for a long period of time in a fresh and wholesome condition and free from any taint, odor, or taste foreign to that of the eggs themselves. I attain this object by means of a compound consisting of the following ingredients substantially in the proportions named, to wit: beach-sand or other cleaned-washed sand, two hundred pounds; slaked lime, twelve pounds; linseed-oil, four-fifths of a pound; water, substantially free from vegetable matter, twenty-five pounds. I prefer to mix these ingredients in the following manner: I first mix a portion of the water—say about twenty pounds—with the sand until the water is evenly distributed therein. The remaining portion of the water is then mixed with the lime until the lime becomes of the consistency of paste. The linseed-oil is then added to the lime paste and thoroughly mixed therewith. The mixture of lime, water, and oil is then added to the moistened sand and the whole is worked together until the mass becomes homogeneous. It is not essential that the mixing of the ingredients be effected precisely in the manner I have just described, the essential point being that the different ingredients must be thoroughly and intimately mixed together, and I have found by experiment that this may be most easily accomplished by proceeding in the manner pointed out.

In using this compound after it has been prepared a layer thereof of approximately two inches, more or less, is laid in the bottom of a water-tight vat, tank, or other receptacle wherein the eggs are to be stored. A layer of eggs, which should be fresh and in their natural condition, is then placed upon the bottom layer with the point ends of the eggs downward and a space between the eggs, so that no two shall touch each other. Another layer of compound is then placed over the eggs, and the eggs will be thereby maintained in their upright position and at the proper spacings. A sufficient amount of the compound is placed above the layer of eggs to completely cover the same, and upon the eggs that are covered another layer of eggs is placed and covered by compound in the same manner as above. After the tank or vat has been filled or as many eggs packed away as desired the upper layer of eggs is covered with compound to the depth preferably of about two inches. Enough water is then poured into the vat to cover the top layer of compound to the depth of one or two inches. The water should be free from any vegetable matter which would tend to decay, and as the water evaporates more water is supplied. The water prevents the air from gaining access to the eggs and also keeps the compound at the proper consistency. Eggs packed in this manner may be stored for many months without deteriorating in any respect or acquiring any unnatural odor or flavor. I have made a test upon eggs in this manner and have found at the end of fourteen months the eggs were substantially unchanged in any particular.

It is my understanding that the lime used in my compound forms a germicide and disinfectant which prevents decay or the generation of any form of germs. The linseed-oil, although comprising but a small proportion of the compound, seems to have a waterproof and air-proof effect upon the entire mass. It also renders the compound more cohesive and plastic, giving a "body" which would otherwise not be present in a compound containing such a large proportion of sand. This last-named feature is important, as it insures the isolation of the eggs one from another, thus preventing decay.

An advantage in the employment of sand is that, being composed chiefly of silica, it is proof against the action of any acids which might be present in minute quantities, and the danger of fermentation is thereby reduced.

Having thus described my invention, what I claim as new, and desire to secure by Letters Patent, is—

1. A preserving compound for packing eggs, comprising sand, vegetable oil, and lime mixed together with water in sufficient amount to moisten the entire mass to thereby produce a plastic compound having sufficient body to support the eggs packed therein.

2. A preserving compound for packing eggs, consisting of the following ingredients substantially in the proportions named, to wit: sand, two hundred pounds; slaked lime, twelve pounds; linseed-oil, four-fifths of a pound; water, twenty-five pounds.

CHARLES C. THERKILDSEN.

Witnesses:
JOHN S. NERGARD,
HOWARD M. COX.